(12) United States Patent
Sali et al.

(10) Patent No.: US 6,902,113 B2
(45) Date of Patent: Jun. 7, 2005

(54) SELECTION OF COLORS FOR COLOR BAR CODES

(75) Inventors: Erez Sali, Savion (IL); Michael Keselbrener, Tel-Aviv (IL)

(73) Assignee: ImageID Ltd., Rosh Ha'ayin (IL)

( * ) Notice: Subject to any disclaimer, the term of this patent is extended or adjusted under 35 U.S.C. 154(b) by 0 days.

(21) Appl. No.: 10/635,935

(22) Filed: Aug. 7, 2003

(65) Prior Publication Data

US 2005/0029355 A1 Feb. 10, 2005

(51) Int. Cl.$^7$ ................................................ G06K 7/10
(52) U.S. Cl. .......................... 235/462.04; 235/462.24; 235/462.15; 235/469
(58) Field of Search ...................... 235/462.04, 462.24, 235/462.15, 469, 462.45

(56) References Cited

U.S. PATENT DOCUMENTS

| | | | | |
|---|---|---|---|---|
| 4,044,227 A | * | 8/1977 | Holm et al. ................. 235/437 |
| 4,488,679 A | * | 12/1984 | Bockholt et al. ........... 235/469 |
| 4,939,674 A | * | 7/1990 | Price et al. .................. 358/1.9 |
| 5,369,261 A | * | 11/1994 | Shamir ....................... 235/469 |
| 5,406,640 A | * | 4/1995 | Fitzpatrick et al. ........... 381/11 |
| 5,426,289 A | * | 6/1995 | Kinoshita et al. ........... 235/469 |
| 5,576,528 A | * | 11/1996 | Chew et al. ................. 235/469 |
| 5,682,030 A | * | 10/1997 | Kubon .................. 235/462.25 |
| 5,869,828 A | * | 2/1999 | Braginsky .................... 235/469 |
| 5,992,748 A | * | 11/1999 | Takahashi et al. ..... 235/462.04 |
| 6,375,075 B1 | * | 4/2002 | Ackley et al. ......... 235/462.04 |
| 2002/0163659 A1 | * | 11/2002 | Ohkubo ....................... 358/1.9 |

FOREIGN PATENT DOCUMENTS

WO         WO 00/04711          1/2000

OTHER PUBLICATIONS

William H. Press, et al., Numerical Recipes in C, second-edition, pp. 444–455, Cambridge University Press.

* cited by examiner

Primary Examiner—Karl D. Frech
Assistant Examiner—Allyson N Trail
(74) Attorney, Agent, or Firm—AlphaPatent Associates Ltd.; Daniel J. Swirsky

(57) ABSTRACT

A method for color bar codes includes selecting N bar code colors for a color bar code system to be generally distinct from each other given the range of colors that a camera reader is expected to produce given at least one environmental condition in which the camera reader is expected to operate.

9 Claims, 9 Drawing Sheets

SELECTION OF COLORS FOR COLOR BAR CODES

FIELD OF THE INVENTION

The present invention relates to the selection of distinct colors generally and to such for color bar codes in particular.

BACKGROUND OF THE INVENTION

Color bar codes are known in the art, though they are not prevalent. U.S. Pat. No. 5,426,289 to Kinoshita et al., U.S. Pat. No. 5,992,748 to Takahashi et al., U.S. Pat. No. 5,869,828 to Braginsky, U.S. Pat. No. 5,406,640 to Fitzpatrick, et al., U.S. Pat. No. 5,576,528 to Chew, et al., U.S. Pat. No. 4,044,227 to Hoim, et al., U.S. Pat. No. 4,488,679 to Bockhoh, et al., U.S. Pat. No. 4,939,674 to Price, et al. and U.S. Pat. No. 5,369,261 to Shamir teach different kinds of color bar codes.

Typically, a color bar code system creates color bar codes using N of colors For example, N might be 5. To make the code, each bar code color is associated with a numerical value and a color value. If there are N bar code colors, the bar code that uses that color scheme represents numbers in base N. One exemplary code (in the RGB color space) might be the following:

| Color  | Numerical Value |
|--------|-----------------|
| Black  | 0               |
| Blue   | 1               |
| Green  | 2               |
| Red    | 3               |
| Yellow | 4               |

In this example, there are five bar code colors and thus, the code is in base 5. For example, a color bar code of [black, blue, green, yellow] represents the number 0124 in base 5 which translates to the base 10 number of $0*125+1*25+2*5+4=39$.

When printing a particular bar code, the color values of the various regions in the bar code are sent to the printer which, in turn, prints the color bar code. After printing, the color bar code is placed onto an item to be labeled. A color bar code reader is typically a color camera that includes an image sensor, such as a CCD (charge coupled device) or a CMOS (complementary metal oxide semiconductor) camera, and a relevant optical system. The reader reads the bar code and the bar code system identifies the item from the bar code. One exemplary color bar code system is discussed in PCT Publication WO 00/04711 to Shniberg et al., assigned to the common assignee of the present invention, which disclosure is incorporated herein by reference.

Unfortunately, every printer has a limited set of colors that it can print. This set of colors usually does not cover the entire color space. Moreover, the set of all possible colors is perceived, under any illumination, as a new and different set of colors in the color space.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
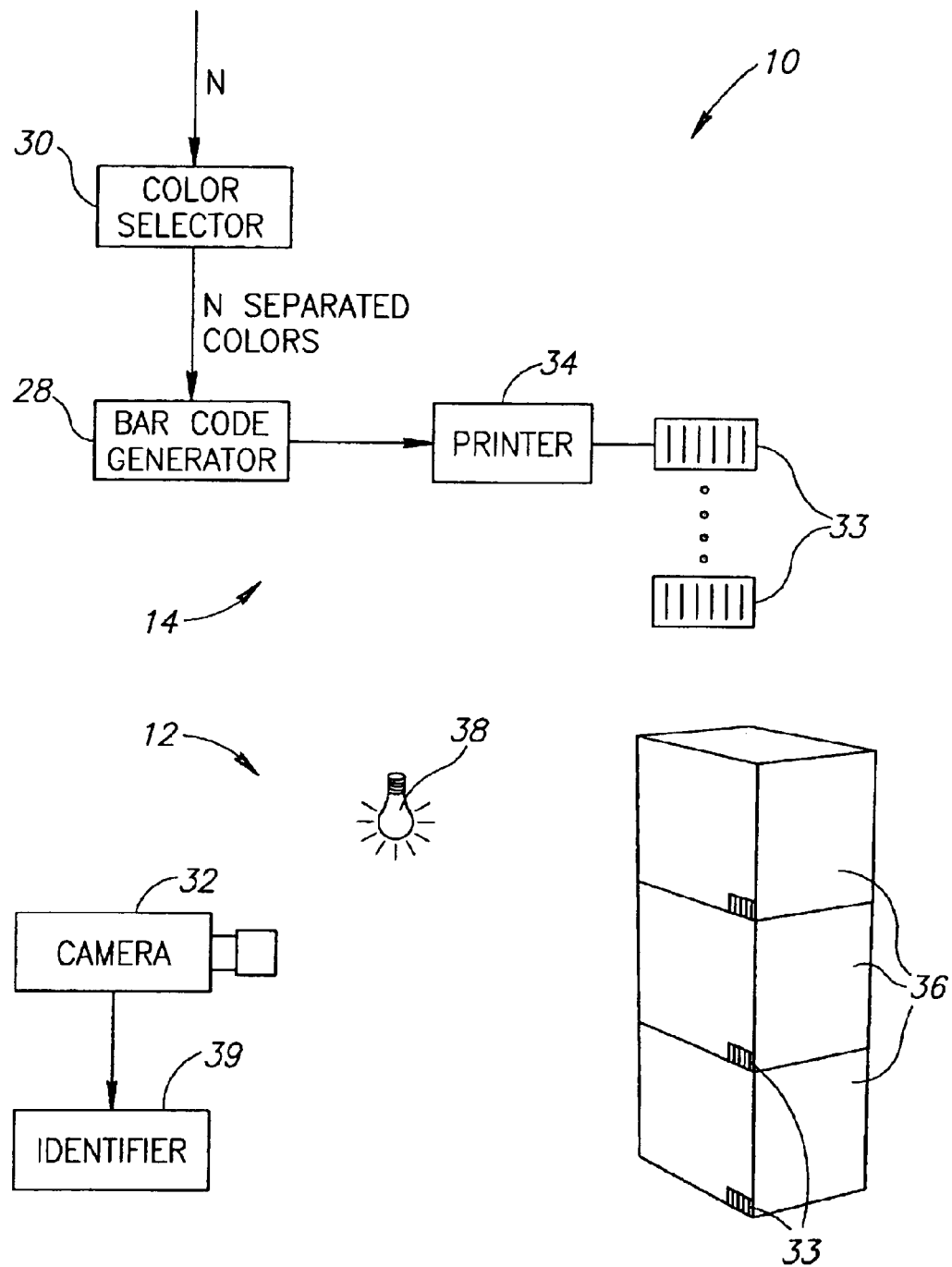
FIG. 1 is a schematic illustration of a color bar code system, constructed and operative in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The association of a color to a digital value is part of the bar code decoding procedure. Applicants have realized that optimizing this association may improve the decoding procedure, making it generally more accurate and/or more efficient and/or more reliable, a necessary condition for using color bar codes in facilities, such as warehouses, which must identify a large multiplicity of bar codes each day.

Applicants have also realized that one optimization method is to select a set of N bar code colors that are generally distinct from each other and ideally, may be as distinct from each other as possible. This may increase the chances that a viewed color value may be correctly identified, because, even if the viewed color value bears little resemblance to the bar code color it is supposed to represent, it is still closer to the bar code color it is supposed to represent than to any of the other bar code colors. In accordance with a preferred embodiment of the present invention, the bar code colors may be selected within the context of the range of colors within a multi-dimensional color space that the camera reader may be expected to produce given at least one of the environmental conditions in which it operates.

Reference is now made to FIG. 1, which illustrates a color bar code system 10 of the present invention. Color bar code system 10 may comprise a bar code reading unit 12 and a bar code generating unit 14.

Bar code reading unit 12 may comprise a camera reader 32 and a color identifier 39. Camera reader 32 may read color bar code labels 33 pasted onto boxes 36. Camera 32 may provide its output to color identifier 39 which may, in turn, identify the information stored in bar code labels 33. Color identifier 39 may decode bar code labels 33 in any suitable manner. One such decoding method is discussed in PCT Publication WO 00/04711 to Shniberg et al., which disclosure is incorporated herein by reference.

Bar code generating unit 14 may comprise a color selector 30, a bar code generator 28 and a printer 34. Color selector 30 may select the set of N bar code colors with which bar code labels 33 are produced, where, typically, N may be provided to color selector 30 by a user. In accordance with a preferred embodiment of the present invention, color selector 30 may choose, for a given number N of bar code colors, a set of bar code colors that are generally distinct. Given such a set of colors, identifier 39 may generally more reliably identify the viewed colors, generally a requirement for a bar code system operating in a warehouse or any other facility which identifies a large multiplicity of bar codes each day.

Bar code generator 28 may generate a multiplicity of identifying values, and may find, for each identifying value, the bar code colors associated with the digits of the identifying value, where the bar code colors are those selected by color selector 30. Bar code generator 28 may then instruct printer 34 to produce the relevant printed color bar codes 33.

In accordance with a preferred embodiment of the present invention, color selector 30 may choose the N bar code colors to be generally distinct from each other given the range of colors that camera 32 is expected to produce. As realized by Applicants, the range of colors may vary with at least one of the environmental conditions in which camera 32 may operate. Typically, the environmental conditions may include the capabilities of printer 34 and of camera 32 as affected by the illumination 38 generally expected to be present when camera 32 reads bar code labels 33. For example, the bar code system of FIG. 1 may operate only in fluorescent light, printer 34 may be an ink-jet printer and camera 32 may have a wide angle lens. The actual color space of such a system may be different from that of a system which operates with Mercury lamp illumination and with a camera with a short focal length.

Figure 2A:
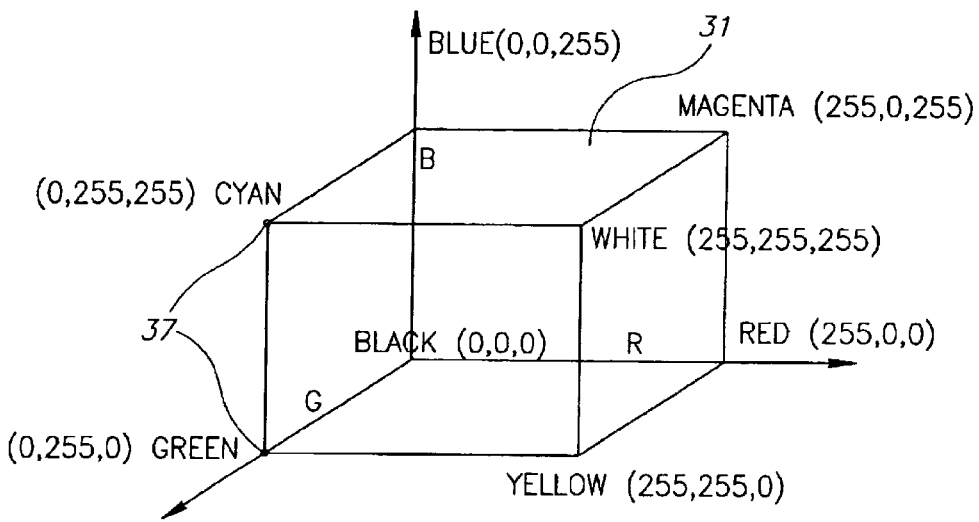
FIG. 2A is a graphical illustration of a portion of an exemplary three-dimensional theoretical color space.
Figure 2B:
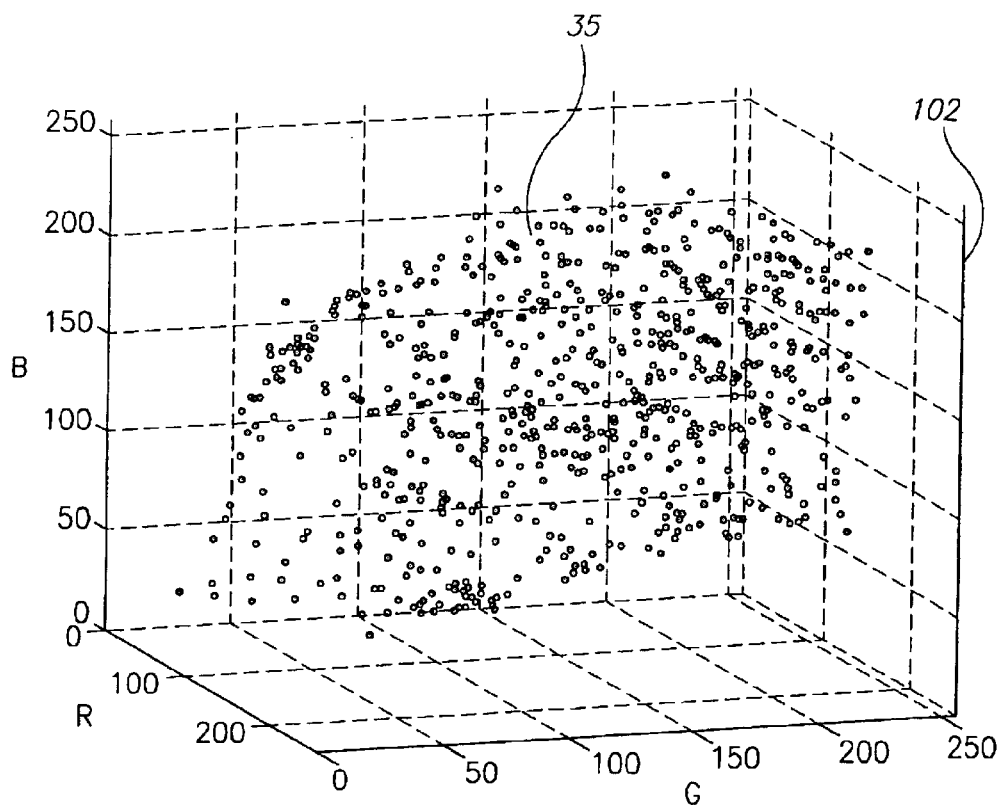
FIG. 2B is a graphical illustration of a three-dimensional actual color space.

Reference is now made to FIGS. 2A and 2B, which respectively illustrate a theoretical color space 31 and an actual color space 35 in the red, green blue (RGB) color space. Each figure shows a three-dimensional graph whose axes represent the red, green and blue discrete values of a three-dimensional digital pixel. The range of values is generally defined from 0 to 255 for each axis. Therefore, theoretical color space 31 is a cube and all points inside this cube belong to color space 31.

In theoretical color space 31, colors that are far away from each other are those at the edges of space 31. For example, for a color scheme of N=8, the colors furthest from each other are the corner coordinates 37 of the cube.

Unfortunately, not all colors of the colors in theoretical space 31 may be obtained since the actual color space is limited by the different elements of the system. In particular, at least one of the illumination, the camera sensor, the camera setup and the printing elements, such as the printer, ink, paper and printing conditions, may affect the range of colors which camera 32 may successfully produce.

One exemplary actual color space 35 may be seen in FIG. 2B. As will be described in more detail hereinbelow, color space 35 was produced under the following conditions: halogen bulb illumination, a Fuji Finepix S2 Pro camera, manufactured by Fuji Corporation of Japan, a HP2000C printer, manufactured by Hewlett Packard Inc. of the USA, and printing onto HP premium Inkjet paper, model 51634Z, also manufactured by Hewlett Packard Inc. As can be seen, actual space 35 is smaller than the 255×255×255 cube that defines theoretical color space 31. Moreover, the corner coordinates 37 of theoretical color space 31 are not part of actual space 35 and thus, cannot be produced by the exemplary system.

In accordance with a preferred embodiment of the present invention, color selector 30 (FIG. 1) may determine the N points furthest away from each other within actual space 35 rather than within theoretical color space 31. This may ensure that the bar code colors be produceable and be generally distinct from each other.

Figure 3:
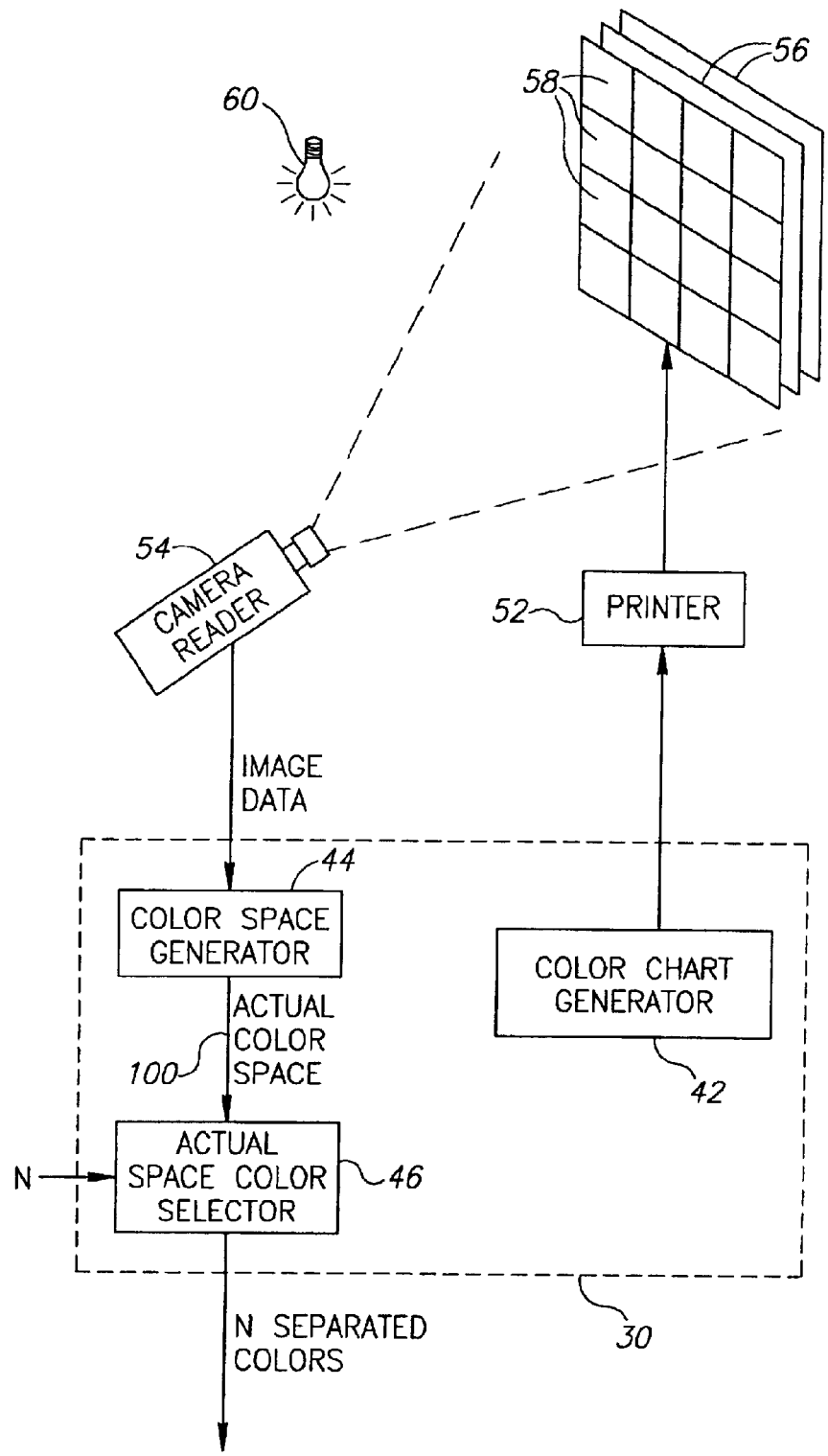
FIG. 3 is a schematic illustration of a color selector and its operation, useful in the system of FIG. 1.

Reference is now made to FIG. 3, which illustrates an exemplary color selector 30 and its operation with a printer 52 and a camera 54. Color selector 30 may comprise a color chart generator 42, a color space generator 44 and an actual space color selector 46.

Color chart generator 42 may generate a graphic file for a plurality of color patches to be printed by printer 52 onto at least one substrate, such as paper, and possibly many substrates. The color charts, labeled 56, may have generally homogeneous color patches 58, where each patch 58 may have a different color value within a three-dimensional color space and may be of any appropriate size for camera 54.

For the example of FIG. 2B, a set of 14 pages was printed, where the printed RGB values ranged from 0 to 255 with a step of 20. Any step size may be possible where the size of the step affects the number of color patches to be processed. Each page corresponded to a constant red value and variable green and blue values. Since a range of 256 is not evenly divisible by 20, the last green or blue value in the color chart was 255 and the one before it was 240. Each color chart was composed of 14×14 color patches and there were 14 pages, giving a total number of color points or pixels to be viewed as 14×14×14=2744 points. (FIG. 2B shows only a subset of these points).

Camera 54 may view color charts 56 and may generate an image of each color chart 56. The working point of camera 54 (i.e. the camera aperture size and the exposure time) may be set to ensure that each patch 58 may receive a different color value and that the received pixel values be above (0,0,0) and below (255,255,255).

Since colors appear different under different conditions, in accordance with a preferred embodiment of the present invention, camera 54 may view color charts 56 under the expected illumination 60 to be used during regular operation of camera reader 54.

Figure 4A:
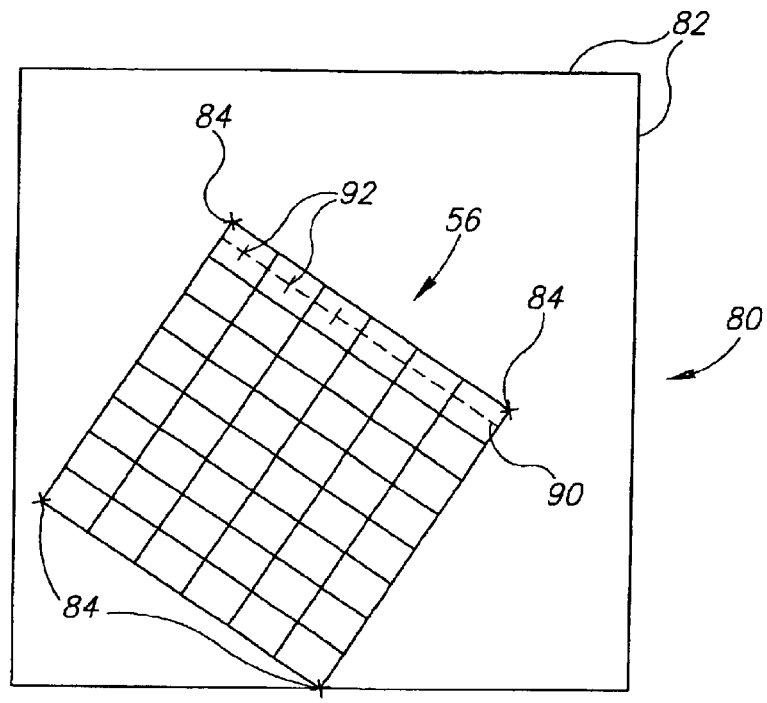
FIG. 4A is a schematic illustration of an exemplary output of a camera reader of FIG. 3.
Figure 4B:
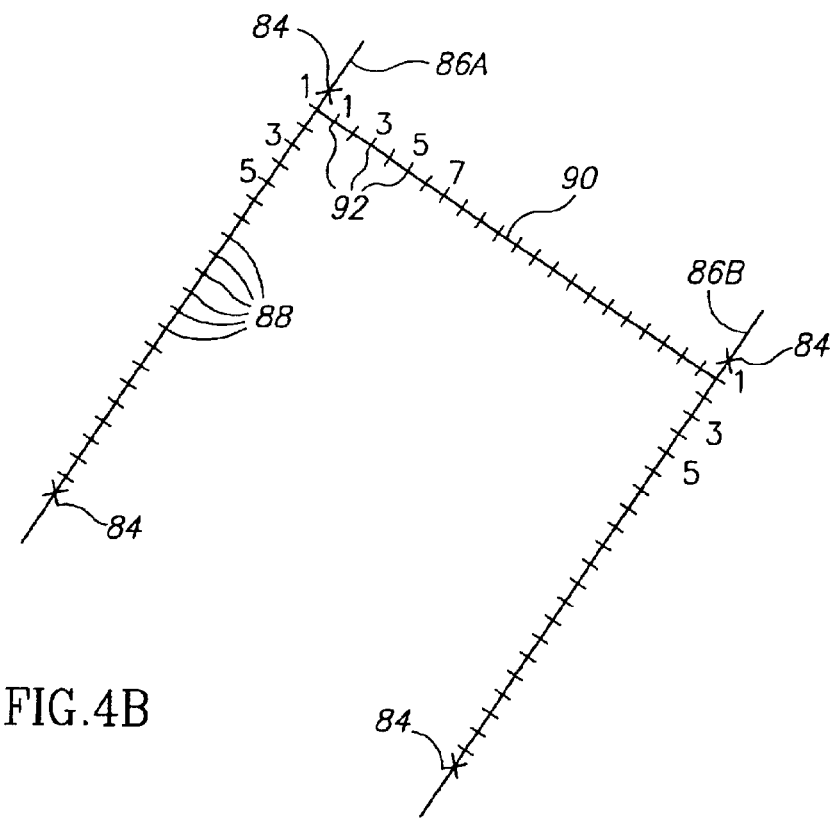
FIG. 4B is a schematic illustrations of calculations performed on the output shown in FIG. 4A.
Figure 5A:
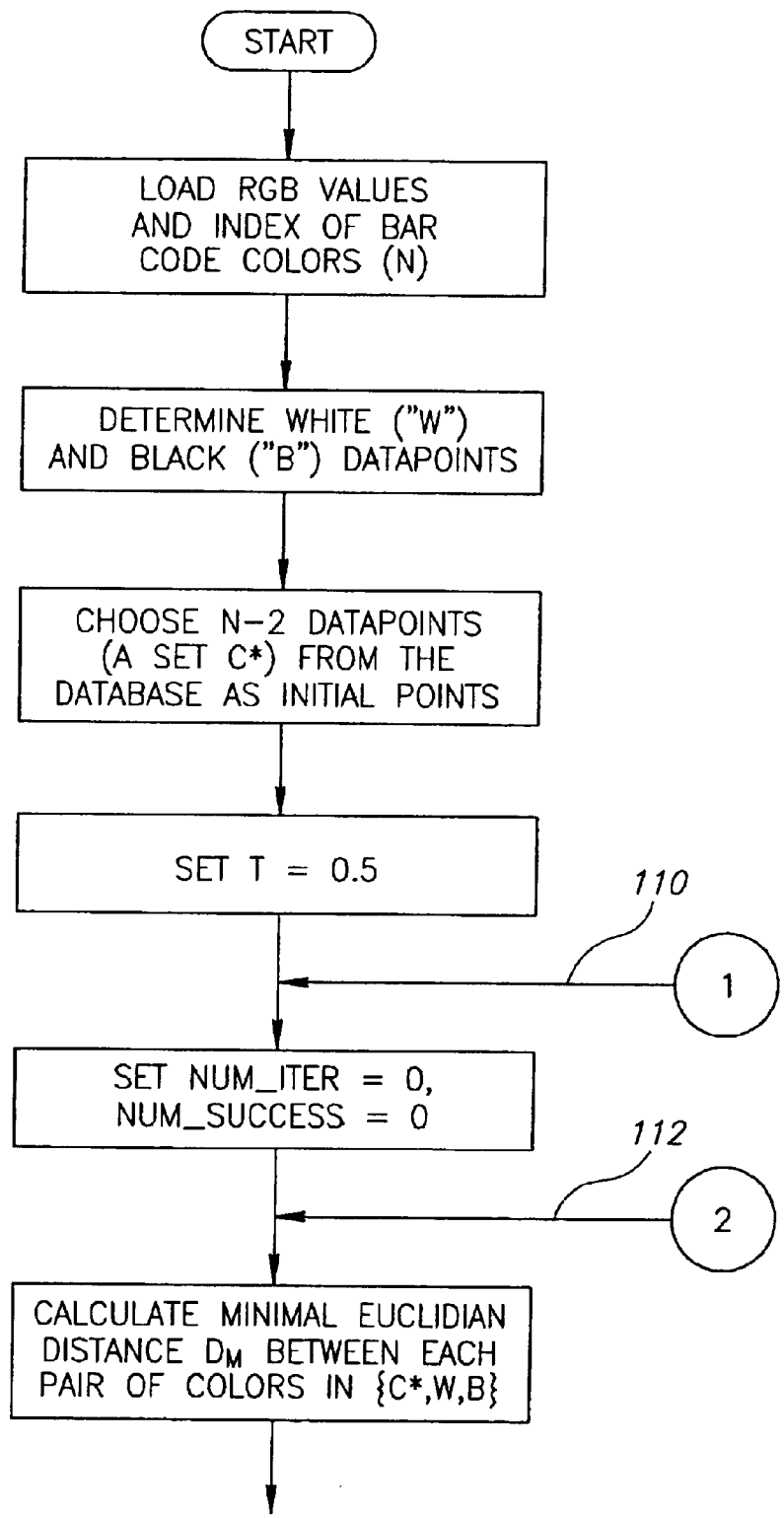
FIGS. 5A, 5B, 5C and 5D together are a flow chart illustration of a method of determining N generally distinct bar code colors within an actual color space.
Figure 5B:
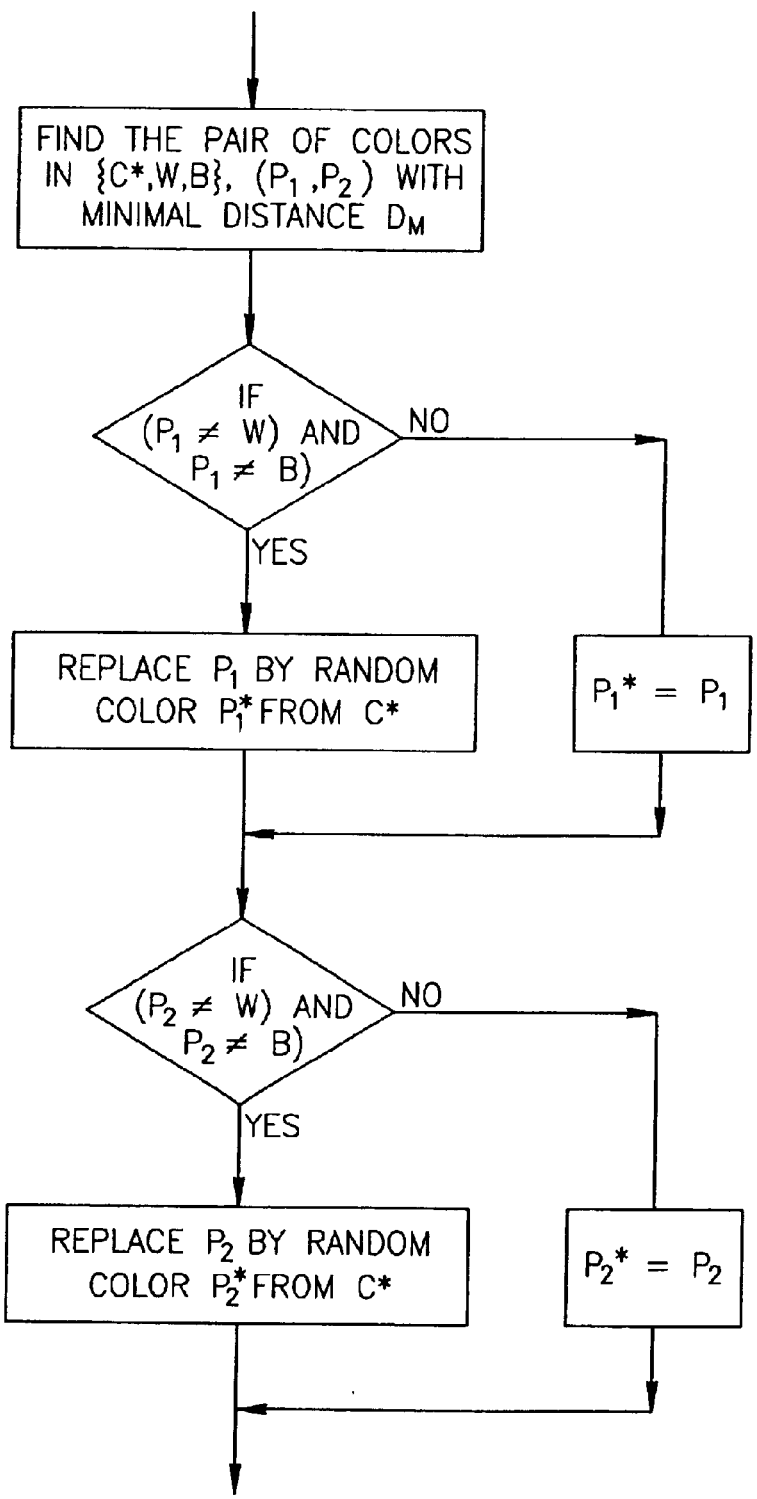
Figure 5C:
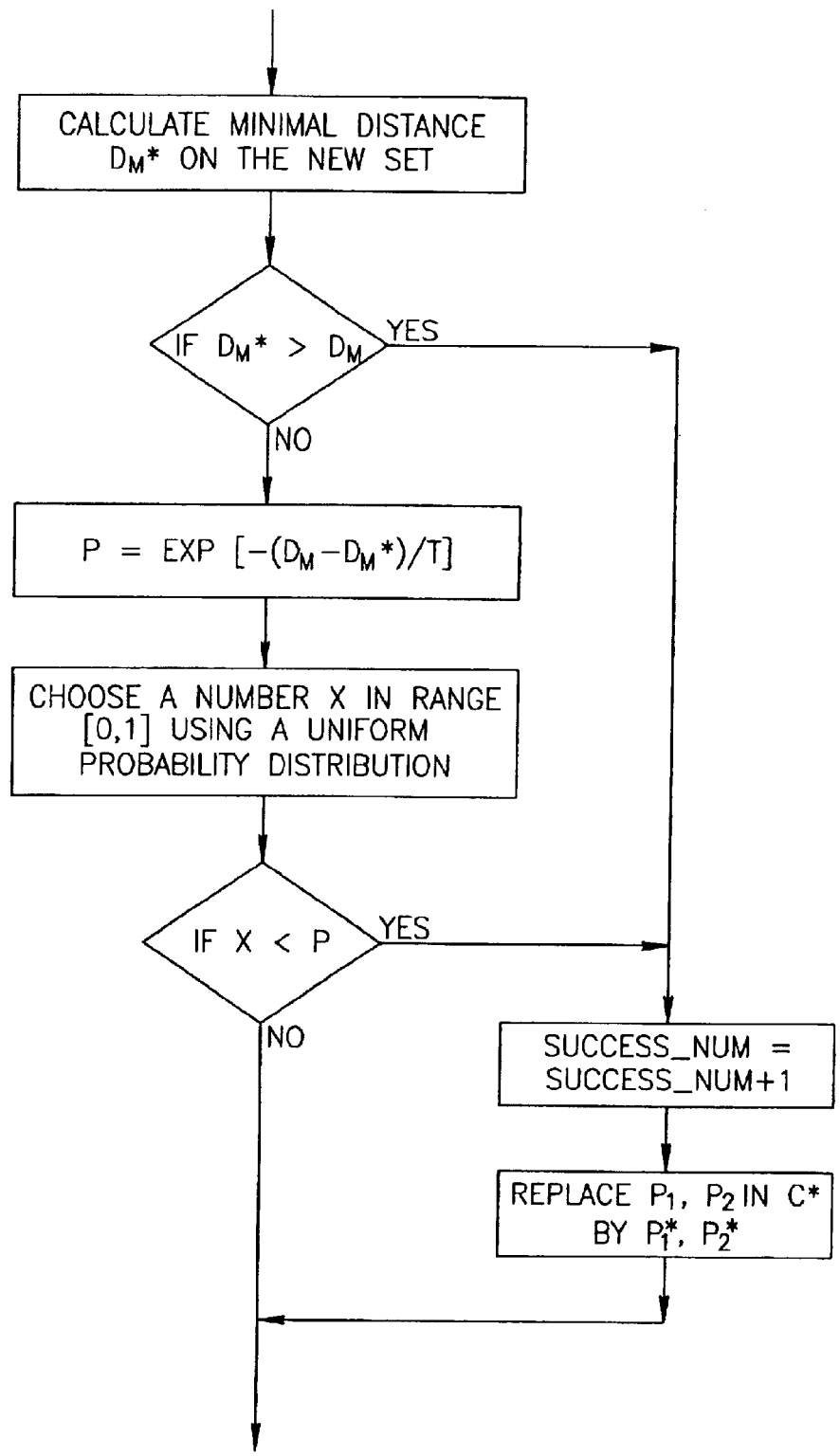
Figure 5D:
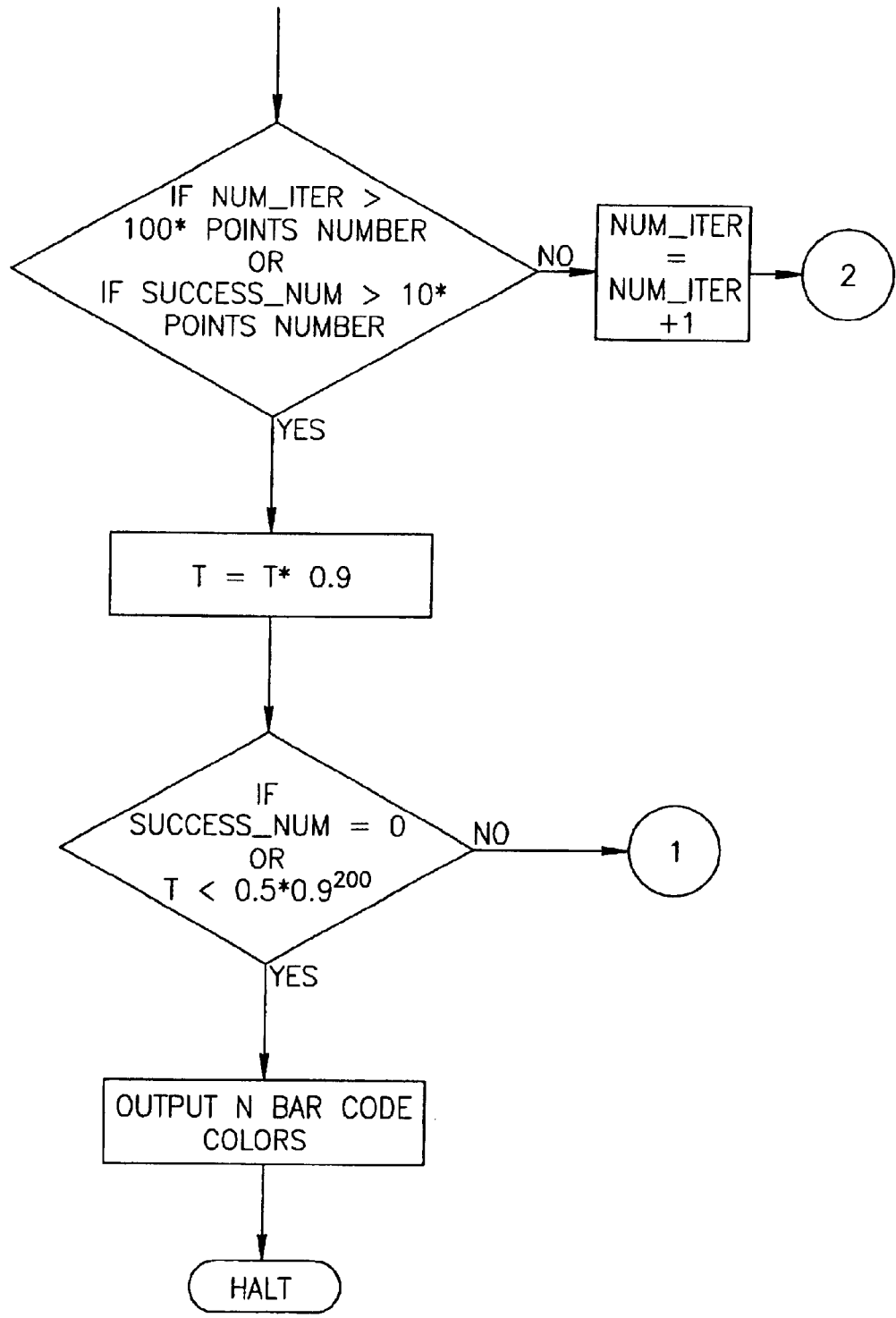

Once the images from viewing color charts 56 have been collected from camera 54, color space generator 44 may create an actual color space database 100, a portion of which is shown as exemplary actual color space 35 of FIG. 2B, for the current operation of camera 54. FIGS. 4A and 4B, to which reference is now made, are schematic illustrations useful in understanding how color space generator 44 may determine the viewed color for each patch 58 (i.e. the patch data) from the image data received from camera 54.

FIG. 4A shows an exemplary image 80 received from camera 54. As can be seen, camera 54 viewed color chart 56 over only a portion of its field of view; moreover, color chart 56 is not aligned with axes 82 of camera 54. In accordance with a preferred embodiment of the present invention, color space generator 44 may generate patch data by first having a user indicate corners 84 of color chart 56. Color space generator 44 may determine the equation of two parallel lines 86A and 86B (FIG. 4B) running between two parallel neighboring pairs of corners 84. Color space generator 44 may then divide the portion of lines 86A and 86B between corners 84 into twice the number of patches expected to be along the line. For example, if color chart 56 is a 10×10 square of patches 58, then color space generator 44 may divide the portion of the line into 20 sections, marking each section with a division mark 88.

For each odd number division mark 88, color space generator 44 may then drop a line 90 connecting the corresponding odd numbered division marks 88 and may divide line 90 into twice the number of patches as expected to be in that direction. For the example above, color space generator 44 may divide line 90 into 20 sections and may select the odd numbered ones, here labeled 92. As can be seen in FIG. 4A, marks 92 fall out generally in the middle of patches 58.

Color space generator 44 may then select the RGB values present at the location of marks 92 and may store this data in actual color space database 100 (FIG. 3).

Returning to FIG. 3, actual space color selector 46 may determine the locations of N points within actual color space database 100 which are generally distinct from each other, where N is user-defined. In accordance with a preferred embodiment of the present invention, selector 46 may be an optimization algorithm. In accordance with a preferred embodiment of the present invention, selector 46 may comprise a "simulated annealer" which may perform the well-known "simulated annealing" optimization algorithm on the data of database 100.

Simulated annealing was derived to simulate thermodynamic systems with numerical calculations and is known as "the Metropolis algorithm". It may be found in the book Numerical Recipes in C by William H. Press, Saul A. Teukolsky, William T. Vetterling, Brian P. Flannery, second edition, Cambridge University Press, pp. 444–455.

In general, the Metropolis algorithm may try "random" steps, and may select new solutions by moving in the direction of results that generally improve the metric. The probability P of choosing the next step may be proportional to the improvement it brings. The algorithm may also allow steps that do not improve the solution and by this the algorithm may escape local maxima. The algorithm may also "cool down"—it may give smaller and smaller probabilities to steps that do not improve the solution. The probabilities may be defined as follows:

$$p(D, T) = \exp\left(-\frac{D}{T}\right)$$

where D may be the difference between the previous minimal distance and the new minimal distance and T may be a parameter of the probability function. The T parameter may be changed downward according to a schedule that tells after how many random changes in configuration each downward step in T may be taken. This downward step in T may ensure the convergence of the algorithm.

The probability function P(D,T) may also depend upon the difference D between two trials and therefore, if a real maximal point was obtained (e.g. a large D), it may be difficult to leave it.

In one embodiment of the present invention, only N-2 colors of the set may be optimized because two other colors, the black and white colors, may be defined as known. They may be defined respectively as the color points with the minimal distances from points (0,0,0) and (255,255,255). Alternatively, they may be defined as the points whose color is that which camera 32 received when viewing the two color patches 58 defined to be the black and white color patches.

In the exemplary embodiment of the present invention, in each iteration of color selector 46, color selector 46 may consider a pair of points of the current set of N points and may attempt to find the furthest distance between them. Color selector 46 may replace these two points with random points and color selector 46 may examine the change in the distance between them. If one of these points is white or black, then only the other point is changed.

FIGS. 5A, 5B, 5C and 5D, to which reference is now made, together illustrate the method performed by exemplary color selector 46 when performing simulated annealing. Color selector 46 may have two nested loops 110 and 112. Inner loop 112 may run for a given T and a maximal number of iterations, such as 100*PointsNumber, where "PointsNumber" is the number of datapoints in database 100. It may operate on a current pair of points. First loop 110 may define how many times the T parameter may be decreased. For example, 200 times. It may also select a new pair of points for inner loop 112 to operate on.

Color selector 46 may perform the following method (detailed in FIGS. 5A, 5B, 5C and 5D):

1. Load the RGB values of the color points in database 100 and the number N of color bar code colors.
2. Load the index of the RGB value of the white and black samples in the points loaded in 1. (In the present application, W=white color, B=black color).
3. Choose N-2 initial colors from the color points; these points will be denoted as C*.
4. Set T to 0.5
5. Set SuccessCounter and IterationNumber to 0
6. Find the pair of points P1,P2 in the current set of colors {C*,W,B}, such that their Euclidian distance Dm is minimal.
7. If P1 is neither white nor black, replace it with a random color P1* from database 100 loaded in step 1. Otherwise, set P1*=P1
8. If P2 is neither white nor black, replace it with a random color P2* from database 100 loaded in step 1. Otherwise, set P2*=P2
9. Calculate the minimal distance Dm* on {C*,W,B} where P1 and P2 in C* are replaced by P1* and P2*.
10. If Dm*>Dm
   a. Increase SuccessNumber by 1
   b. Replace P1 and P2 in C* by P1* and P2*
11. Else
   a. set P=Exp(-(Dm-Dm*)/T)
   b. Choose a number X between 0 and 1 using a uniform distribution
   c. If X<P, increase SuccessNumber by 1 and replace P1 and P2 in C* by P1* and P2*
12. If [(SuccessCounter<10*PointsNumber) and (IterationNumber<100*PointsNumber)]
   a. Increase IterationNumber by 1
   b. Go to step 6
13. Else
   a. Set T=T*0.9
   b. If [(SuccessNumber=0) or (T<0.5*0.9$^{200}$)]
     i. output C*
     ii. Halt c. Else
   i. Go to step 5

Figure 6:
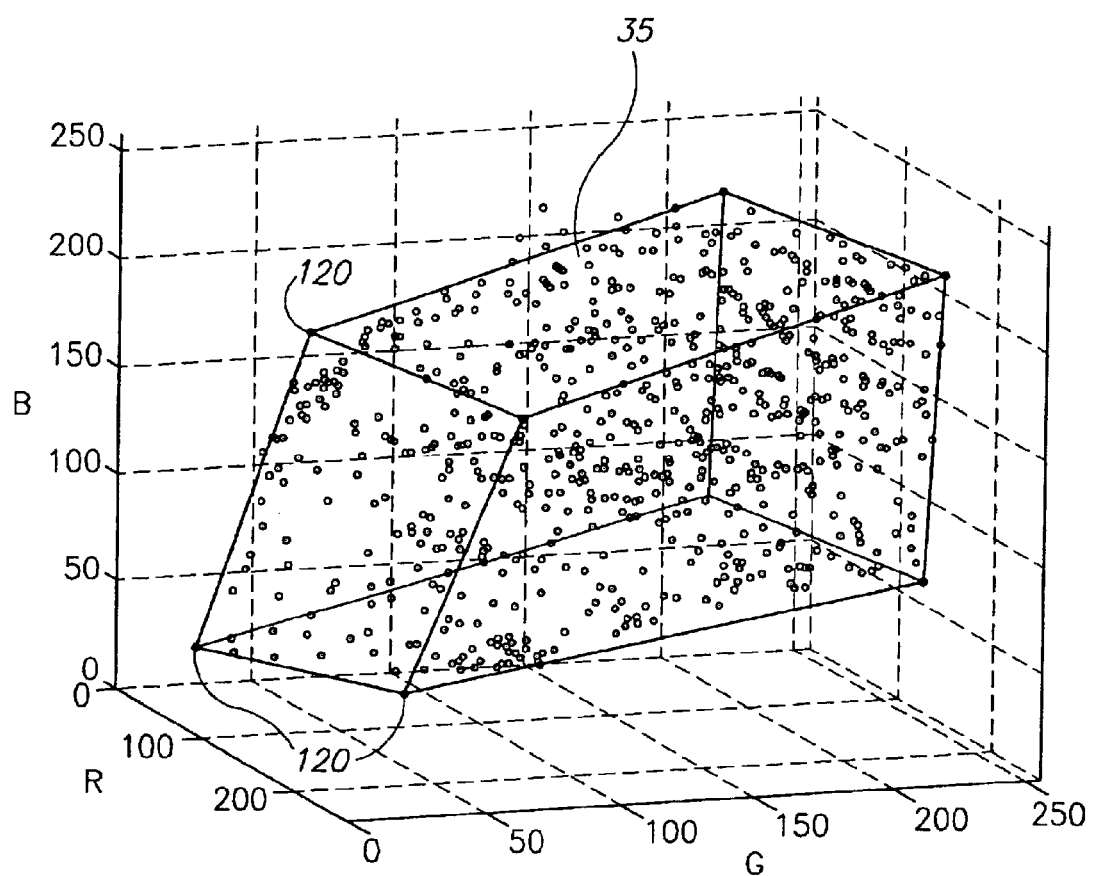
FIG. 6 is a graphical illustration of N selected color bar codes within the actual color space of FIG. 2B.

Reference is now made to FIG. 6, which illustrates actual color space 35 of FIG. 2B overlaid with the selected datapoints 120 for N=8 bar code colors. As can be seen, selected bar code colors 120 appear to be at the outer "corners" of color space 35.

It will be appreciated that color selector 46 may produce the N selected colors by many methods; the method described above with respect to FIGS. 5A, 5B, 5C and 5D is only one embodiment. Other embodiments are incorporated within the present invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A color bar code system comprising:
   a camera reader to read at least one bar code, said bar code being formed of a subset of N bar code colors; and
   a color selector to select said N bar code colors to be generally distinct from each other given a range of colors that said camera reader is expected to produce given at least one environmental condition in which said camera reader is expected to operate,
   wherein said color selector comprises:
      a color chart generator to generate at least one color chart of color patches of a range of colors produceable by a printer capable of printing color bar codes;
      a color space generator to receive an output of a camera reader upon reading said at least one color chart with at least one illumination and to generate a color space database from said output; and
      an actual space color selector to select N bar code colors from said color space database to be generally distinct from each other.

2. A unit according to claim 1 and wherein said actual space color selector comprises an optimizer to attempt to optimize a distance in color space between said N bar code colors.

3. A unit according to claim 2 and wherein said optimizer comprises a simulated annealer.

4. A color selector for a color bar code system, the selector composing:
   a color chart generator to generate at least one color chart of color patches of a range of colors produceable by a printer capable of printing color bar codes;
   a color space generator to receive an output of a camera reader upon reading said at least one color chart with at least one illumination and to generate a color space database from said output; and
   an actual space color selector to select N bar code colors from said color space database to be generally distinct.

5. A unit according to claim 4 and wherein said actual space color selector comprises an optimizer to attempt to optimize a distance in color space between said N bar code colors.

6. A unit according to claim 5 and wherein said optimizer comprises a simulated annealer.

7. A method comprising:
   selecting N bar code colors for a color bar code system to be generally distinct from each other given a range of colors that a camera reader is expected to produce given at least one environmental condition in which said camera reader is expected to operate.
   said selecting comprising:
      generating at least one color chart of color patches of a range of colors produceable by a printer capable of printing color bar codes;
      generating a color space database from an output of a camera reader upon reading said at least one color chart with at least one illumination; and
      selecting N bar code colors from said color space database to be generally distinct from each other.

8. A method according to claim 7 and wherein said second selecting comprises attempting to optimize a distance in color space between said N bar code colors.

9. A method according to claim 8 and wherein said attempting comprises performing simulated annealing on said color space database.

* * * * *